United States Patent [19]

Scaramucci

[11] Patent Number: 4,782,855
[45] Date of Patent: Nov. 8, 1988

[54] CHECK VALVE SEAT AND CAGE RETAINER

[76] Inventor: John P. Scaramucci, 10724 Woodridden, Oklahoma City, Okla. 73170

[21] Appl. No.: 93,973

[22] Filed: Sep. 8, 1987

[51] Int. Cl.$^4$ .............................................. F16K 15/03
[52] U.S. Cl. ............................ 137/527.8; 137/515.5; 137/515.7
[58] Field of Search .............. 137/515, 515.5, 513.7, 137/527, 527.8; 231/361, 362, 363, 365

[56] References Cited

U.S. PATENT DOCUMENTS

| | | | |
|---|---|---|---|
| 444,451 | 1/1891 | Messinger | 137/515.5 |
| 1,764,186 | 6/1930 | Teesdale | 137/515.5 |
| 2,532,067 | 11/1950 | LaBour | 137/515.5 |
| 2,767,735 | 10/1956 | Darling | 137/527 |
| 3,509,908 | 5/1970 | Latham et al. | 137/527.4 X |
| 3,620,653 | 11/1971 | Gaylord et al. | 137/515.5 X |
| 3,933,173 | 1/1976 | Kajita | 137/527.8 |
| 4,257,444 | 3/1981 | Ogle, Jr. et al. | 137/515 X |
| 4,433,702 | 2/1984 | Baker | 137/527 X |
| 4,532,958 | 8/1985 | Napditano | 137/515.7 |

*Primary Examiner*—John Rivell
*Attorney, Agent, or Firm*—Dunlap, Codding & Peterson

[57] ABSTRACT

A swing check valve where the cage is a ring-like member supporting the disc or clapper where the disc is loaded from the downstream end of the body and held in operating position by a tubular retainer extending from the downstream end of the body. The cage and valve seat may be formed separately or as a part of the same member and the seat may be formed as a part of the valve body. The tubular retainer may be split lengthwise and compressed into the valve body for holding the cage and seat in assembled relation during shipment and handling.

11 Claims, 2 Drawing Sheets

CHECK VALVE SEAT AND CAGE RETAINER

CROSS REFERENCE OF RELATED APPLICATIONS

Related subject matter is disclosed in the co-pending applications Ser. No. 23,786, filed Mar. 9, 1987, entitled Check Valve and Ser. No. 60,249, filed June 9, 1987, entitled Swing Check Valve Disc.

BRIEF SUMMARY OF THE INVENTION

1. Field of the Invention.

This invention relates to improvements in swing check valves.

2. Background of the Invention.

Wafer-type swing check valves are historically used between standard pipe flanges. Since standard pipe flanges are normally available to the user, it is convenient and economical to ship a wafer-type valve without flanges; that is, only the valve body, seat, cage and disc. The user can then mount the valve between his own pipe flanges. However, it is most convenient for the valve to be shipped in an assembled relation; that is, with the seat, cage and disc in the proper operating position in the valve body, such that the user simply has to place the valve between pipe flanges and gaskets to have a completed swing check valve.

DETAILED DESCRIPTION OF THE DRAWINGS

Figure 1:
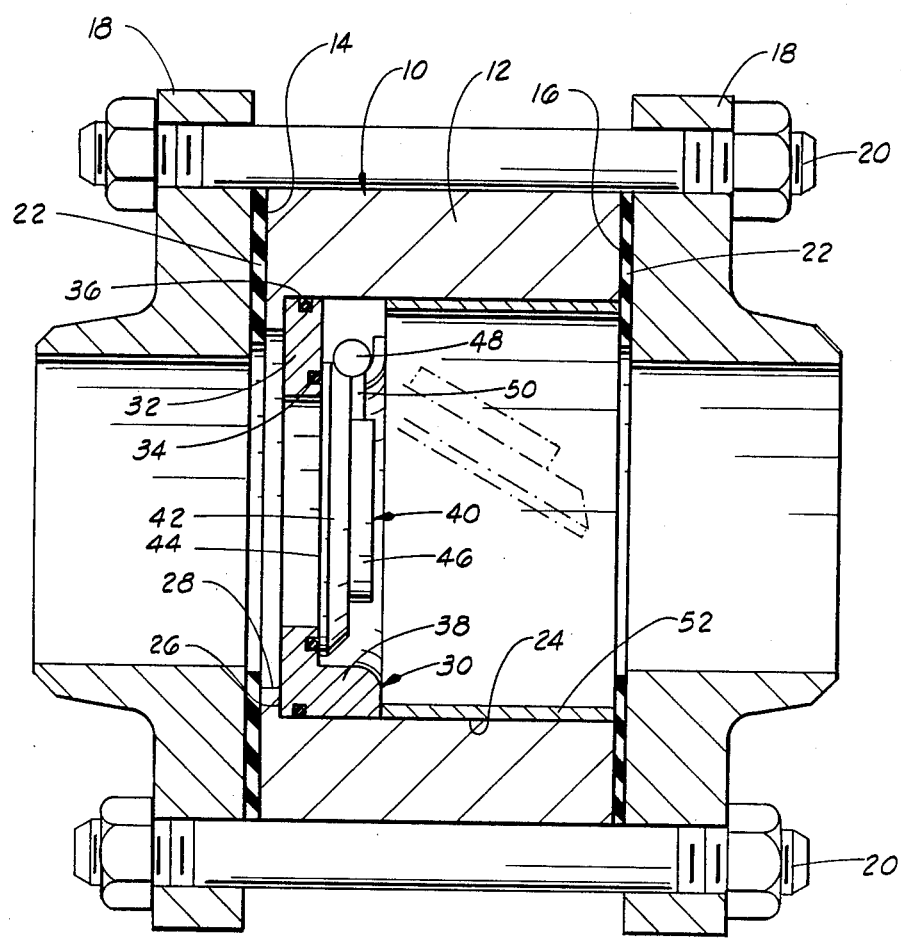
FIG. 1 is a cross sectional view through a swing check valve constructed pursuant to this invention, including the interconnecting standard pipe flanges.

Referring to the drawings in detail, and particularly FIG. 1, reference character 10 generally designates a swing check valve constructed pursuant to this invention. The valve 10 comprises a tubular valve body 12 having planar, upstream and downstream ends 14 and 16. The valve 10 is of the wafer-type designed for use between standard pipe flanges 18 interconnected by bolts 20. In a typical arrangement, gaskets 22 are positioned between each pipe flange 18 and the adjacent end of the valve body.

A counterbore 24 is formed in the downstream end 16 of the valve body 12 and provides an annular shoulder 26 adjacent the upstream end 14 of the valve body facing in the same direction as the downstream end 16. The shoulder 26 thus encircles the inlet 28 of the valve.

A combination valve seat and cage member generally designated by reference character 30 fits in the counterbore 24 against the shoulder 26. The member 30 includes an annular valve seat portion 32 which has a suitable sealing ring 34 mounted in a mating groove in the seating face of the seat portion 32. Also, a suitable sealing ring 36 is mounted in a mating groove around the outer periphery of the seat portion 32 to sealingly engage the walls of the counterbore 24 and prevent the leakage of fluid around the member 30. As shown, the seat portion 32 of the member 30 abuts the shoulder 26.

The member 30 also includes a ring-like portion 38 which forms a cage for the valve disc generally designated by reference character 40. The disc 40 has a relatively flat, round, main body portion 42 having a flat seating face 44 for engaging the seating face of the seat 32. The main body portion 42 of the disc 40, on the side opposite the seating face 44, has a protrusion 46 thereon which adjusts the distribution of the mass of the disc and tends to retain the disc in a closed position as shown in FIG. 1 by the action of gravity.

Figures 2, 3:
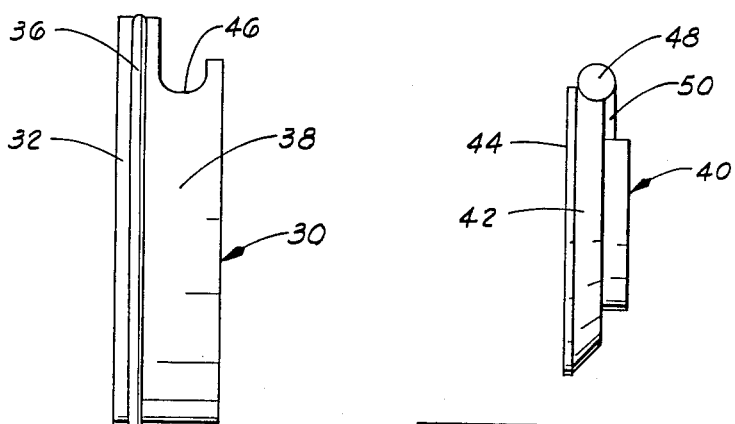
FIG. 2 is an elevational view of the combination cage and seat used in the valve of FIG. 1.
FIG. 3 is an elevational view of the valve disc used in the valve of FIG. 1.

As shown in both FIGS. 1 and 2, the cage portion 38 of the member 30 includes a hinge pin recess 46 to receive the hinge pin 48 of the disc 40. The hinge pin 48 is preferably formed integrally with the main body portion 42 of the disc 40 and the centerline thereof extends in a plane parallel with the seating face 44 of the disc. A transition section 50 extends from the protrusion 46 to the central portion of the hinge pin 48 to strengthen the connection of the hinge pin to the main body portion of the disc. The disc 40 is shown separately in FIG. 3. It should also be noted that the inner diameter of the cage portion 38 of the member 30 is slightly greater than the outer diameter of the main body portion 42 of the disc 40, such that the cage 38 guides the disc 40 in its final closing movements.

A tubular retainer 52 lines the walls of the counterbore 24 and extends from the downstream end of the member 30 to the downstream end 16 of the valve body 12 to hold the member 30 and disc 40 in the desired operating positions in the valve body 12. The tubular retainer 52 preferably has an outer diameter of a size to provide a snug fit in the counterbore 24, such that the tubular retainer 52 will retain the member 30 and disc 40 in assembled relation during the handling and shipping of the valve 10 separate from the pipe flanges 18. When the valve 10 is assembled between the pipe flanges 18, the tubular retainer 52 will be held by the downstream gasket 22 and downstream flange 18 in the position shown in FIG. 1 to hold the member 30 against the shoulder 26.

Figure 4:
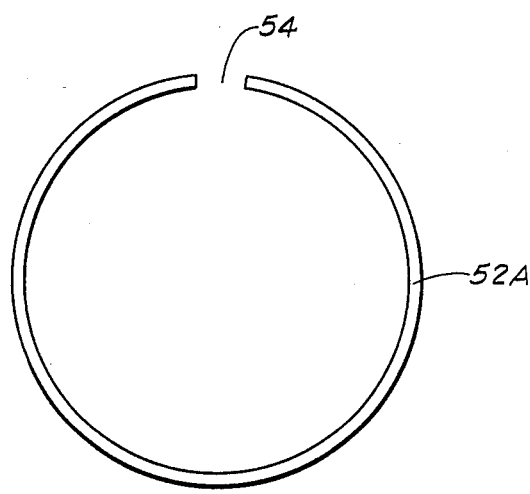
FIG. 4 is an end view of a modified tubular retainer for the valve of FIG. 1.

As shown in FIG. 4, the tubular retainer may be modified into the form designated by reference character 52A which comprises a tubular member having a slit 54 extending lengthwise therethrough. The size of the modified retainer 52A is such that in a relaxed condition, the outer diameter of the modified retainer is greater than the diameter of the counterbore 24. Thus, the modified retainer 52 must be compressed for insertion in the counterbore 24 and will grip the walls of the counterbore 24 when released in the counterbore. With this arrangement, the member 30 will be more certainly held in position and in engagement with the annular shoulder 26 during the shipping and handling of the valve.

Figure 5:
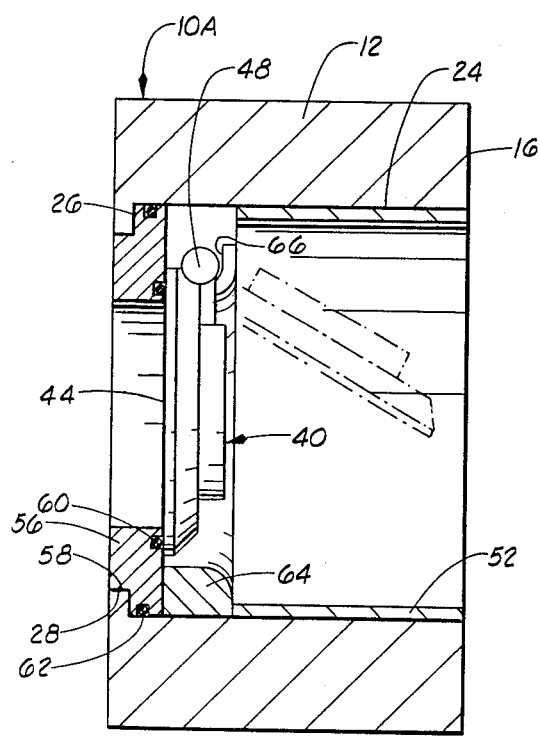
FIG. 5 is a cross sectional view through another form of swing check valve constructed pursuant to this invention, shown separate from the interconnecting pipe flanges.

A modified swing check valve generally designated by reference character 10A is illustrated in FIG. 5. The valve 10A includes the valve body 12 containing the counterbore 24 and annular shoulder 26 facing the downstream end 16 of the valve body. In this embodiment, a separate valve seat ring 56 engages the annular shoulder 26 and is provided with an annular groove 58 in the outer periphery thereof mating with the inlet bore 28 of the valve body. A sealing ring 60 is provided in the seating face of the ring 56 to engage the seating face 44 of the disc 40. Also, a sealing ring 62 is provided in the outer periphery of the ring 56 to sealingly engage the walls of the counterbore 24 and prevent the leakage of fluid around the seat.

A separate ring-like cage 64 fits in the counterbore 24 against the seat 56. The cage 64 is shaped in the same fashion as the cage portion 38 of the member 30 previously described, to provide a hinge pin recess 66 therein for receipt of the opposite end portions of the hinge pin 48 of the disc 40. Thus, the cage 64 supports the disc 40 for swinging movement toward and away from the seat 56 and the inner diameter thereof is sized to guide the disc 40 onto the seat during the final closing movement of the disc.

The seat 56 and cage 64 are held in position in the body 12 by the tubular retainer 52 or the modified tubular retainer 52A. In either event, the seat 56 and cage 64 can be maintained in operating position during shipping and handling of the valve, as well as during operation of the valve when it is installed between mating pipe flanges.

Figure 6:
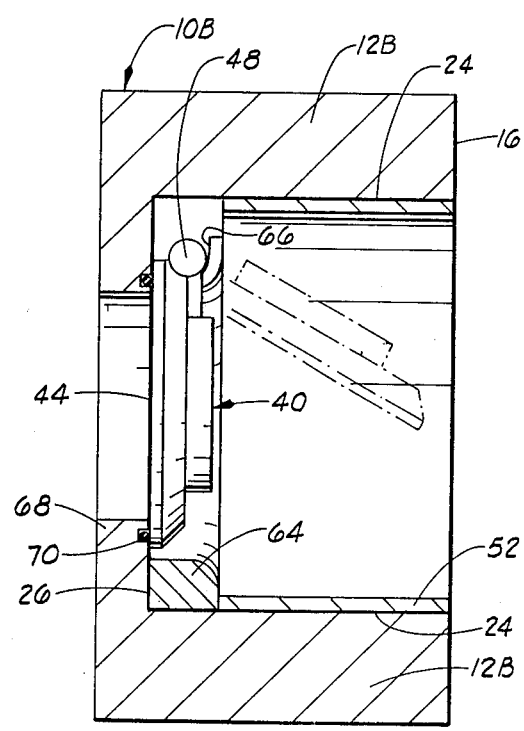
FIG. 6 is a view similar to FIG. 5 of another form of swing check valve constructed pursuant to this invention.

Another modified swing check valve 10B is illustrated in FIG. 6. The valve 10B utilizes a modified valve body 12B which contains the counterbore 24 and annular shoulder 26. In this modification, however, the shoulder 26 is extended radially inwardly to provide an annular seat portion 68 sized to mate with the seating face 44 of the disc 40. Also, the seat portion 68 is provided with a suitable sealing ring 70 in a mating groove therein to sealing engage the disc 40.

The disc 40 is surrounded and supported by the cage 64. The tubular retainer 52 is sized to engage the downstream end of the cage 64 and extend throughout the remaining length of the counterbore 24 to hold the cage and disc in assembled relationship during shipping and handling, as well as during operation of the valve.

Changes may be made in the combination and arrangement of parts or elements as heretofore set forth in the specification and shown in the drawings without departing from the spirit and scope of the invention as defined in the following claims.

What is claimed is:

1. A valve for use between flanges, comprising:
   a tubular body having upstream and downstream planar ends for mating with adjacent flanges, said body having a counterbore in the downstream end thereof forming an annular shoulder in the body facing in the same direction as said downstream end;
   an annular seat in the body facing the downstream end of the body;
   a ring-like cage in said counterbore between the seat and the downstream end of the body;
   a disc supported in the cage for swinging movement toward and away from the seat; and
   a tubular retainer lining the walls of the counterbore and extending from the cage to the downstream end of the body for holding the cage in position against the seat.

2. A valve as defined in claim 1 wherein the walls of the retainer are continuous.

3. A valve as defined in claim 1 wherein the retainer is split lengthwise and has an outer diameter greater than the inner diameter of said counterbore in an uncompressed state thereof.

4. A valve as defined in claim 1 wherein the seat and cage are formed integrally and are held against said shoulder by the retainer.

5. A valve as defined in claim 1 wherein the seat and cage are separate members held in abuting relation against said shoulder by the retainer.

6. A valve as defined in claim 1 wherein the seat is a part of said annular shoulder and the cage is held against said annular shoulder by the retainer.

7. A valve for use between flanges, comprising:
   a tubular body having planar ends for mating with adjacent flanges, said body having a counterbore in one end thereof forming an annular shoulder facing in the same direction as said one end;
   an annular seat in said counterbore;
   a ring-like cage in said counterbore abutting the seat;
   a disc supported in the cage for swinging movement toward and away from the seat; and
   tubular retainer means lining said counterbore and extending from said one end of the body holding the seat and cage in operating position.

8. A valve as defined in claim 7 wherein the walls of said retainer means are continuous.

9. A valve as defined in claim 7 wherein said retainer means is split lengthwise and has an outer diameter greater than the inner diameter of said counterbore in an uncompressed state thereof.

10. A valve as defined in claim 7 wherein said seat and cage are formed integrally.

11. A valve as defined in claim 7 wherein said seat and cage are separate members held in abutting relation.

* * * * *